Aug. 17, 1943.   H. M. JOHNSTON   2,327,308
HITCH FOR TRACTOR DRAWN IMPLEMENTS
Filed Oct. 2, 1941
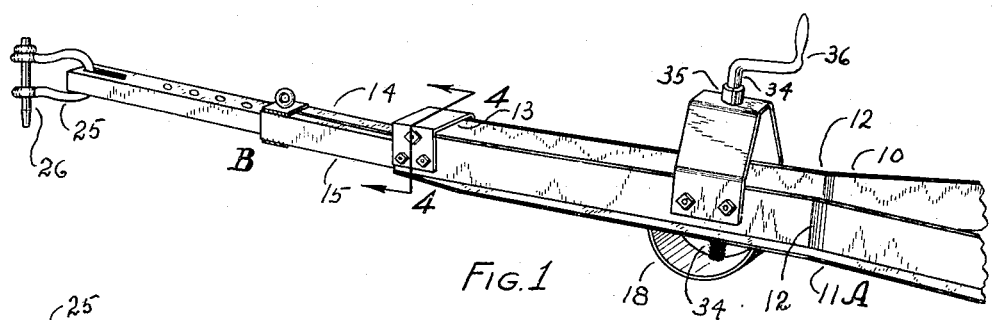
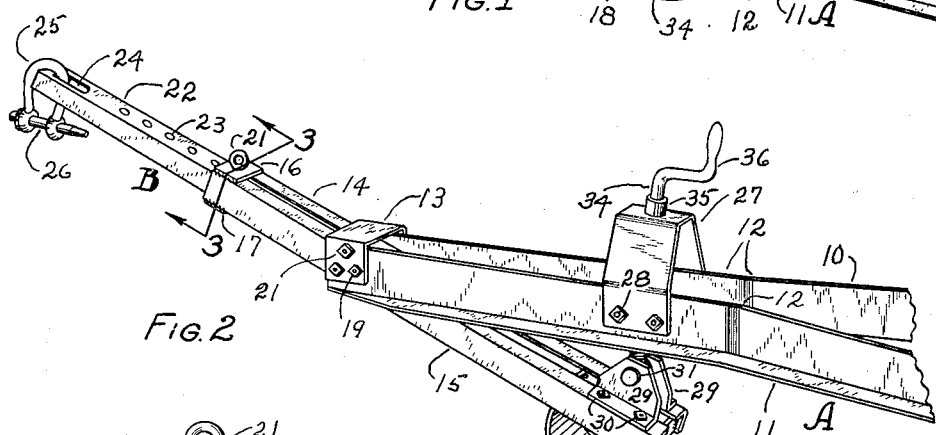
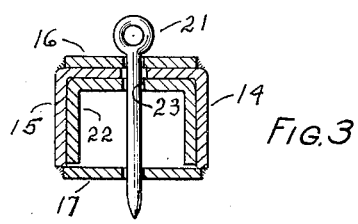
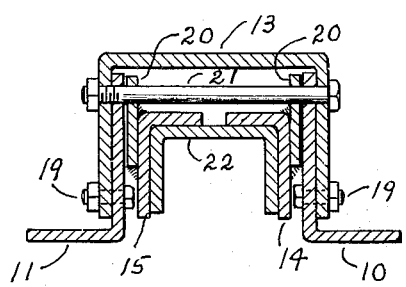
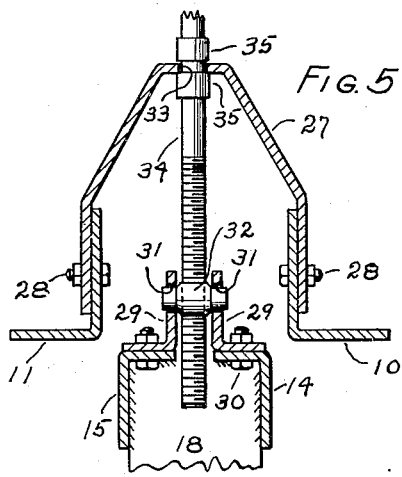
INVENTOR.
HOWARD M. JOHNSTON
BY A. S. Krch
ATTORNEY Patented Aug. 17, 1943

2,327,308

UNITED STATES PATENT OFFICE 2,327,308

HITCH FOR TRACTOR DRAWN IMPLEMENTS

Howard M. Johnston, Toronto, Ontario, Canada, assignor to Massey-Harris Company Ltd., Toronto, Ontario, Canada, a limited corporation of Canada Application October 2, 1941, Serial No. 413,279

3 Claims. (Cl. 280—33.44)

The present invention relates to hitches for tractor drawn implements and has for its object, providing a hitch which can be readily adjusted at its front end to the height of the draw bar to which it is to be attached by means of a manually operated crank.

The present device is provided with means for supporting the front end of the hitch on the ground when it is not attached to the tractor, the ground contacting means being the medium by which the front end is held at any desired height and whereby the ground contact means and the front end of the major part of the hitch is raised to an operating position after the connection is made to the draw bar of the tractor.

An object of the present invention is to provide a hitch which can be readily changed as to its length.

Generally speaking, the principal objects of the present invention are to provide a hitch having the adjusting means previously referred to and a device which is simple, easily manufactured at low cost and easily operated and a device which is pleasing in appearance.

To these and other useful ends, my invention consists of parts, combinations of parts, or their equivalents, and mode of operation, as hereinafter set forth and claimed and shown in the accompanying drawing in which:

Fig. 1 is a perspective view of my improved hitch in its operating position or in the position when it is hitched to a tractor.

Fig. 2 is a view similar to Figure 1 except that the hitch supporting means is in it slowest position or ground contacting position.

Fig. 3 is a transverse section taken on line 3—3 of Figure 2.

Fig. 4 is a transverse section taken on line 4—4 of Figure 1.

Fig. 5 is a transverse fractional section taken in line with the screw threaded adjusting means.

The drawing illustrates one form of embodiment of my invention wherein the forwardly extending part of the implement is designated in its entirety by reference character A. The forwardly extending hitch device is designated in its entirety by reference character B. Member A may be an integral part of the implement frame and it may be stated that generally this part is called the hitch member of the implement wherein means are provided at its forward end for a direct connection to the draw bar of a tractor.

There is always more or less weight on the draw bar member and before the connection is made to the draw bar of the tractor, the forward end of the member lies on the ground. When it is desired to make a connection to the draw bar of a tractor, it is necessary to lift this member manually so it will be in alignment with the tractor draw bar. Usually one or two men can lift this member and the tractor operator can then back the tractor until the draw bar can be connected. This process is very awkward and difficult. In my invention, the forward end of member A never rests on the ground. Usually when it is necessary to disconnect the tractor, the crank is turned until the weight rests on the ground contacting means and the hitch is therefore free so the clevis pin can be readily removed and the tractor driven away.

When it is necessary to reconnect a tractor to the implement, all that is necessary is to back the tractor so the tractor draw bar is the right distance from member B, then the front end of member B is moved to a position horizontal with the tractor draw bar by turning the crank after which the clevis can be swung over the tractor draw bar and the linchpin dropped into position and then the ground engaging means can be lifted and the weight shifted to the tractor.

Clearly I have provided a one man hitch for all types of implements, a hitch that can be adjusted to the tractor and connected with the tractor draw bar by anybody capable of driving a tractor.

Member A comprises preferably two angle bars 10 and 11 which converge forwardly terminating at 12 from whence the ends extend forwardly in parallel relation. The forward ends of the bars are tied together by means of a bracket 13.

Member B comprises angle irons 14 and 15. These members are secured together at their fronts by upper and lower plates 16 and 17 and the rear ends are secured together by means of a runner 18. This runner is curved as illustrated, the upper ends being fit between the downwardly extending flanges of members 14 and 15 and being preferably welded thereto. Member 13 is secured to members 10 and 11 by means of bolts 19 and members 14 are spaced slightly and adapted to fit loosely between the heads of these bolts (see Figure 4).

I provide upwardly extending brackets 20—20 which are welded to members 14 and 15 and having openings for the reception of bolt 21. Members 10, 11 and 13 are provided with similar openings for the reception of this bolt. It will be seen that member B is hingedly mounted on member A. Members 16 and 17 are provided with central openings for the reception of a linchpin 21.

I slidably mount a draw bar member 22 between members 14 and 15 having a suitable length and spaced openings 23 whereby member 22 may be moved longitudinally and locked into position by linchpin 21. The forward end of member 22 is provided preferably with a slotted opening 24 adapted to receive a clevis 25 having a clevis pin 26 adapted to pass through openings in the draw bar of a tractor.

I provide an inverted U-shaped bracket 27 which is secured to members 10 and 11 as indicated in the figures by means of bolts 28. L-shaped brackets 29—29 are secured to members 14 and 15 by means of bolts 30. Members 29 are provided with enlarged openings 31 adapted for the reception of trunnions on a threaded member 32. An opening 33 is provided in the upper end of member 27 through which a threaded bolt 34 extends having thrust collars 35—35.

The upper end of member 34 is provided with a crank 36. Bolt 34 engages the threads in member 32 so that by turning crank 36, the rear ends of members 14 and 15 will be raised and lowered.

Figure 1 illustrates the hitch in an operating position or in the position in which it is attached to the tractor and at which time member 18 is a considerable distance away from the ground.

Figure 2 illustrates the position of member B when crank 36 is turned counterclockwise far enough to raise the front end of member 22 to the height of the highest tractor draw bar.

It will be seen that when the tractor draw bar connection is made and crank 36 is turned clockwise because of the thread on member 34 being right hand, the weight of the front end of the hitch will be placed on the tractor draw bar and members A and B will then be substantially in the position shown in Figure 1.

Clearly by manipulating crank 36, the front end of the draw bar may be moved to any desired height and the implement may be adjusted, within limits, to its desired horizontal position. When the connection to the tractor draw bar is broken, the front end of member B may be held to its normal height and member 22 may be moved longitudinally so as to adjust the distance between the tractor draw bar and the implement.

It will be seen that my invention provides convenient means for hitching, for example, a farm implement to a tractor, for supporting the draw bar and for disconnecting the hitch and that my device is simple, easily manufactured at low cost, easily understood and operated and pleasing in appearance and that when the implement is disconnected from the draw bar, it may be held in its normal working position.

I have shown the preferred embodiment of my invention. Clearly many minor detail changes may be made without departing from the spirit and scope of the present invention as recited in the appended claims.

Having thus shown and described my invention, I claim:

1. A hitch device of the class described, comprising a forwardly extending hitch member forming a rigid part of the machine to be drawn, another hitch member hingedly connected intermediate its ends to the forward end of said first hitch member, manually operated means between the rear end of said other hitch member and the first hitch member adapted for changing the relative angle between said hitch members, means on the forward end of said other hitch member adapted for connection to the draw bar of a tractor, said other hitch member comprising two parts telescoped together, spaced openings in one of said telescoped parts and an opening in the other, a linchpin or bolt adapted to extend through one of said spaced openings and said last opening, whereby the distance between the tractor and implement may be determined.

2. A hitch device of the class described, comprising a forwardly extending hitch member forming a rigid part of the machine to be drawn, another hitch member hingedly connected intermediate its ends to the forward end of said first hitch member, manually operated means between the rear end of said other hitch member and the first hitch member adapted for changing the relative angle between said hitch members, means on the forward end of said other hitch member adapted for connection to the draw bar of a tractor, a runner on the rear end of said other hitch member whereby when the angles between said hitches are great enough, said runner will rest on the ground and act as a support for said hitches.

3. A device as recited in claim 2 including; said manually operated means comprising an upwardly extending inverted U-shaped bracket secured to said hitch member above the rear end of the other hitch member, a crank rotatably mounted in said bracket and being held against end movement and having an elongated downwardly extending threaded end, a screw threaded nut transversely rotatably mounted on the rear end of said other hitch member and being engaged by said threaded portion.

HOWARD M. JOHNSTON.